United States Patent [19]

Ingraham

[11] 3,941,866

[45] Mar. 2, 1976

[54] METHOD OF BONDING A THERMOPLASTIC RESINOUS PROTECTIVE COATING TO A METALLIC SUBSTRATE

[75] Inventor: Glen E. Ingraham, Lebanon, N.J.

[73] Assignee: Colorguard Corporation, Raritan, N.J.

[22] Filed: July 31, 1973

[21] Appl. No.: 384,374

[52] U.S. Cl. ............... 264/135; 427/118; 264/174; 264/178 R; 264/237
[51] Int. Cl.² ...................... B29F 3/10; B29C 25/00
[58] Field of Search ........ 264/174, 237, 348, 178 R, 264/135; 117/232, 218

[56] References Cited
UNITED STATES PATENTS

| 2,531,169 | 11/1950 | Sprung | 117/218 |
| 3,532,783 | 10/1970 | Pusey et al. | 264/174 |
| 3,795,540 | 3/1974 | Mildner | 117/232 |

Primary Examiner—Jeffery R. Thurlow

[57] ABSTRACT

A metallic substrate, such illustratively as wire, to which is bonded by means of a resinous hot melt adhesive and in a continuous operation a thermoplastic resinous coating. The method of making the coated metallic substrate comprises applying a resinous hot melt adhesive about the metallic substrate and thereafter extruding a molten thermoplastic resin onto the deposited adhesive at high rates of speed.

15 Claims, 4 Drawing Figures

U.S. Patent  March 2, 1976  3,941,866
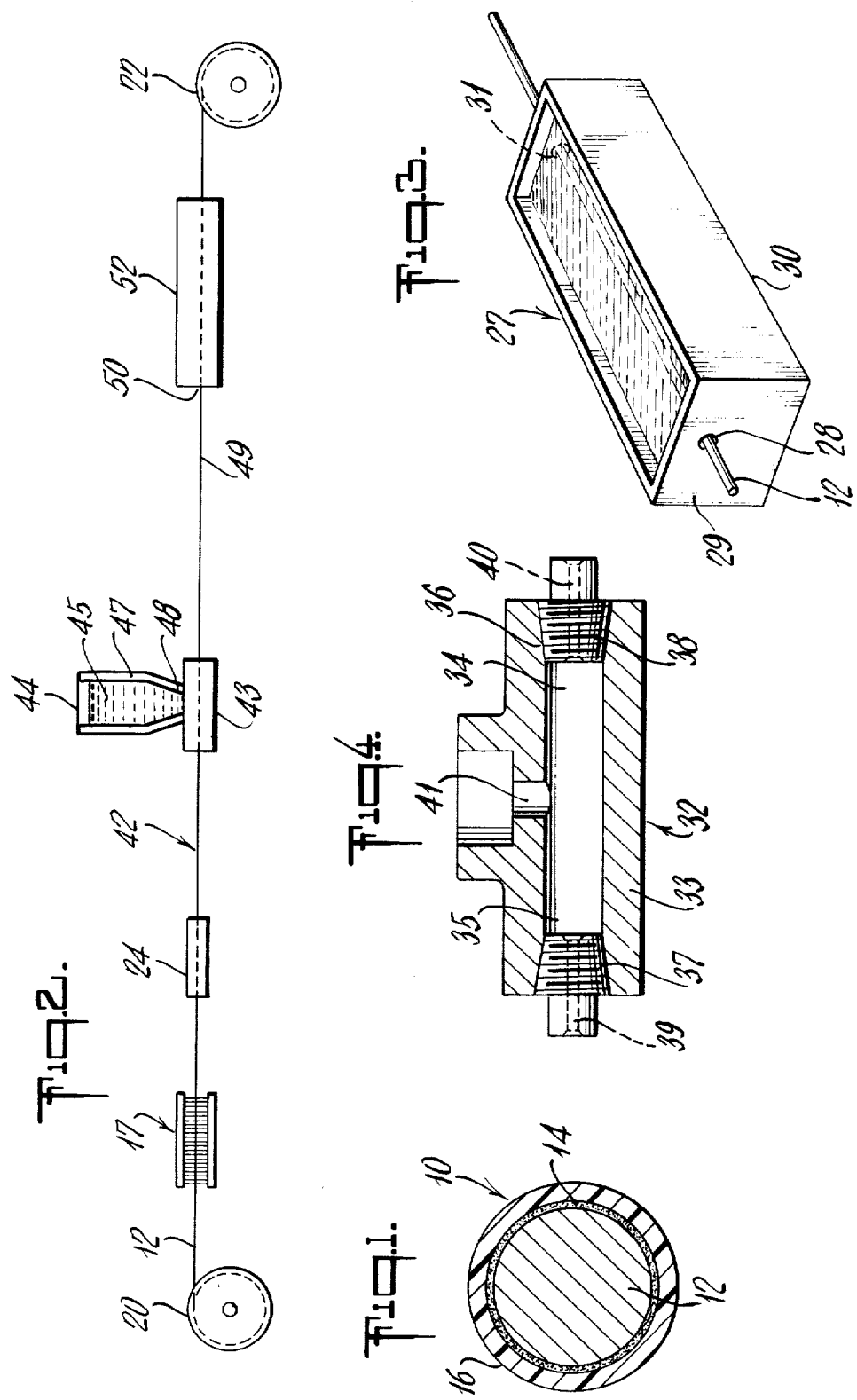

METHOD OF BONDING A THERMOPLASTIC RESINOUS PROTECTIVE COATING TO A METALLIC SUBSTRATE

BACKGROUND OF THE INVENTION

The unbonded coating of metallic substrates with molten plasticized thermoplastic resin has been achieved by a variety of methods. One such method involves the extrusion of vinyl halide resin compositions onto a core or substrate of galvanized steel to secure a coating providing an assured resistance to weather and aging, including oxidizing agents and corrosive constituents of many environments in which this resulting coated product may, in the ordinary course of outdoor usage, be exposed. Coated metallic substrates so secured, have been known, when incorporating suitable plasticizers, to manifest a flexibility without cracking, impact hardness and resistance to abrasion which makes them particularly useful in application to wire to be formed into, for example, chain-link fence. These fence materials present, in addition, an esthetically pleasing appearance.

The metallic substrate of these coated materials is rendered vulnerable, however, where only a single ply of unbonded plastic is present because of the relative ease with which the plastic can be cut and removed in relatively substantial lengths by the deliberate effort of vandals or others, a condition which tends to be prevalent in heavily industrial locations, public playgrounds and the like.

The bonding of a thermoplastic resin coating to the metallic substrate has been known to reduce this ease of removal. This has been accomplished by treating wire, for example, with a primer heated to an elevated temperature and the composite of wire and primer passed through a fluidized bed of vinyl resin powder. The wire substrate used commercially in the practice of this latter process has been found to be ungalvanized steel. Inherent in this process, additionally, has been the formation of a microporous coating of limited thickness, i.e. about 7–10 mils, and this vinyl coating has been found to evidence reduced resistance to ultraviolet radiation over a sustained period. The relative thinness of the coating which can be achieved by this method has been found to permit corrosive atmospheres even in the absence of removal of the coating. This vulnerability is, of course, of particular significance where the substrate is, illustratively, ungalvanized steel. The production of vinyl coated metallic substrates employing plastisols or organosols of vinyl chloride resins has also been projected, but the combination of steps including particularly the removal of diluents from the coating and the absorption of plasticizers in the fusion phase tend to render the processes uneconomic, both by reason of the reduced speeds at which, for example, wire must pass through the coating step, e.g. up to about 300 feet per minute, and the high temperature baking ovens necessary for fusion, utilizing high levels of electric energy.

SUMMARY OF THE INVENTION

It is the general object of this invention, therefore, to provide a metallic substrate to which is bonded a thermoplastic resin coating of sufficient thickness to preserve the composite assembly of coating and substrate despite its exposure to a broad variety of weather and atmospheric conditions over an extended period of time.

More specifically, it is an object of this invention to provide means for producing, in a continuous operation, at speed of up to about 2000 feet per minute, a wire to which has been bonded an extrudable thermoplastic resin, particularly, a vinyl resin coating of a thickness sufficient to assure protection against extremes of temperature and humidity, as well as against abrasion and oxidizing agents such as mineral acids, sea water and other dilute solutions of salt and alkali, while conveying an esthetically pleasing effect.

A further object is to provide means for accomplishing the foregoing objectives without materially disturbing existing commercial methods for producing the most desired of unbonded, coated metallic substrates or extending materially the time necessary to produce the corresponding bonded product.

It is a still further object of this invention to provide a wire having the foregoing properties which, when coated, will have a measure of flexibility sufficient so that it may be flexed or bent to form chain-link fence fabric without cracking and which has an improved resistance to peeling and thus to deliberate human effort to destroy it by cutting of the protective or insulated coating.

Another and particular object of the invention is to provide a method of bonding a vinyl chloride resin composition to a galvanized steel wire suitable for use in chain-link fabric in a high speed process, wherein the bonding component is a hydrophobic resinous composition, thus providing a multi-ply corrosion inhibiting protective coating to the wire substrate.

Accordingly, the present invention provides a metallic substrate or core to which is bonded in a uniform thickness an extrudable thermoplastic resin, particularly, a plasticized thermoplastic vinyl chloride resin including vinyl acetate copolymers thereof, by means of a hot melt hydrophobic resinous adhesive composition.

The process of producing the coated substrate envisioned herein includes passing a metal substrate, particularly and preferably wire from a coil which has been subject to cleaning by conventional chemical or other and standard physical means, through a plurality of treatment zones at speeds of up to about 2000 feet per minute. The first of these zones is one in which a hot melt adhesive is deposited uniformly upon the wire in transit. To effect the uniform deposition required, the adhesive is maintained at a temperature of about 200° F. to 450° F. The hot melt adhesive is then passed through a cooling zone in which the coating is cooled to a temperature at which it assumes an essentially solid state with resistance to flow, at which point the adhesive enters a third zone in which the protective vinyl resin coating is applied to the advancing adhesive coated core at a uniform rate. The vinyl resin is most desirably a plasticized vinyl chloride homopolymer, although vinyl chloride-vinyl ester copolymers may also be utilized. The resin coating is applied at a temperature within the range of 300° F. to 450° F. to secure the necessary viscosity for uniform flow and in order to raise the temperature of the adhesive to one sufficient to provide an effective and permanent bond with the vinyl coating. The temperature secured in the extrusion zone is that achieved in the heating and shearing of the solid plasticized resin prior to extrusion thereof onto the adhesive coated substrate.

The coated product comprising a laminate of metallic substrate, adhesive ply and outer vinyl resin ply is then cooled to a hardened state in a final cooling zone before being assembled for storage, transportation or immediate use for its intended purpose, for example, in chain-link fence.

The foregoing and other objects, features and advantages of the invention will become more apparent from the description appearing hereinafter in connection with the accompanying drawings forming part of this application.

BRIEF DESCRIPTION OF THE DRAWINGS

FIG. 1 is a cross-sectional view of the laminated product prepared according to the present invention.

FIG. 2 is a semi-diagrammatic illustration of the method employed according to the invention in producing the product of FIG. 1.

FIG. 3 is a perspective view of apparatus used in the practice of the process according to the invention.

FIG. 4 is a sectional view of an alternative apparatus for use in the practice of the invention.

DESCRIPTION OF THE PREFERRED EMBODIMENTS

Referring now in detail to the accompanying drawings wherein the preferred embodiment of the invention is manifested, there is shown in FIG. 1 the coated and bonded wire 10 incorporating the metallic substrate 12 preferably formed of galvanized steel, and surrounding this substrate, a continuous ply of hot melt adhesive 14 to which is bonded in turn as the exterior ply, a coating of vinyl halide resin composition 16.

The metallic substrate treated according to the practice of this invention may vary substantially as to conformation, flexibility and the metal employed. Illustratively, the process herein described has application to relatively smooth metallic surfaces such as copper, aluminum, brass, magnesium, steel, whether galvanized, ungalvanized, bethanized, aluminum coated or high strength, low alloy steels in which the alloy is, for example, chromium, silica, copper, nickel, phosphorus alloy (sold by the U.S. Steel Corporation under the trade name COR-TEN A steel) or a manganese, chromium, vanadium alloy (sold by U.S. Steel Corporation as COR-TEN B steel), or steel surface-treated with phosphoric acid for example; and whether in the form of tubing, H-beams, web constructions, flat plate, cable, filament or wire strands, and the like. The invention herein described has particular and unique application, however, to wire having most desirably a smooth, nodule-free surface, as shown in FIG. 1, and that paid out at high speeds from a coil which, after coating is completed, may be conveniently reformed as a coil. While the dimensions of the substrate to be coated are not narrowly critical, where wire is, for example, being coated, preferred limits have been found where, illustratively, the wire is to be used in making chain-link fence having a cross-sectional diameter within the range of about 0.076 inch to about 0.192 inch. Indeed, the invention is especially practicable for use with normally rigid wire of this diameter and having, in addition, a tensile strength of 65,000 to 120,000 psi.

A method for producing the composite wire 10 of FIG. 1, according to a preferred embodiment of the invention, is shown, except where otherwise expressly indicated herein, in FIG. 2 employing standard apparatus. Thus, a continuous metallic wire core 12 is drawn at speeds of up to about 2000 feet per minute through a plurality of treatment zones in which it receives successive resinous plies (designated by the numerals 14 and 16 in FIG. 1) and is subjected to several significant variations in temperature.

More particularly, according to this process a coil of untreated wire 12 is uncoiled from a supply stand or pay-off frame 20 which may be of standard design and drawn through successive treatment zones at a line rate of speed of between about 200 to approximately 2000 feet per minute and preferably within the range of about 800 to about 1500 feet per minute.

Indeed the bond between the galvanized steel wire 12 and the extruded vinyl coating 16 provided by the hot melt adhesive 14 is improved with increased line speed as is the esthetic appeal of the coated product as reflected in the high surface gloss achieved at these increased rates of speed, thus enhancing the useful life and desirable appearance of the product while decreasing its cost of manufacture. While not intended to be limited to any particular theory of operation, it is believed that this phenomenon is attained by virtue of the increased activation afforded the adhesive when it comes into contact with the extruded vinyl resin which at the higher rates of line transmission will be extruded onto the wire more rapidly and at higher temperatures within the ranges recited in accordance with the invention.

The initially uncoiled wire is, in any event, first cleaned by standard physical means such as brushes or cloth 17, or alternatively by conventional chemical reagents to remove dust, oil or other foreign substances from the substrate or core 12, after which it is transmitted through a first treatment zone 24 comprising, in a preferred embodiment the device of FIG. 3, an insulated heated dipping tank 27 preferably of rigid double wall construction, containing an entry orifice 28 with a suitable entry die (not shown) through which the wire 12 is advanced into the tank 27 thus preventing leakage of adhesive present in the molten state within the tank 27 from about the advancing wire 12. Heating elements (not shown) are disposed within or about the walls of the tank in standard manner to secure the elevated temperatures required to melt the normally solid adhesive and achieve the temperature necessary to effective coating of the wire 12. Positioned at the level of the entry orifice 28, but in the wall opposite that 29 in which the entry orifice 28 is defined, is an exit orifice 31 comprising a sizing die of the requisite diameter to provide the desired thickness of adhesive coating 14 on the wire core 12 leaving the first treatment zone. The dipping tank 27 is preferred particularly because the viscosity of the adhesive may vary within a broader range than where other applicator means are used. Illustrative alternatives are however available and useful as shown in FIG. 4, where the wire core 12 may be transmitted through a cross-head applicator 32 that constitutes the first treatment zone 24. The fluid adhesive, normally solid at ambient or room temperatures, is pumped into the applicator at an elevated temperature sufficient to render it a molten plastic or through the feed screw of a conventional extruder apparatus into the foregoing cross-head applicator or die 32. The adhesive is heated in part by the frictional or shearing forces exerted by kneading of the resinous adhesive in the barrel of a conventional extruder and more particularly by heating means disposed in conventional manner in a jacket mounted about the feed screw barrel or other passage or mixing chamber through which the adhesive is conveyed to the applicator head. A commercially available hot melt applicator is that designated by the trade name Spraymation and particularly that bearing the grade designation 84300 manufactured by Spraymation, Inc., Little Falls, New Jersey used to supply adhesive to a cross-head applicator or die 32 in a preferred embodiment of this type of treatment means. The applicator 32 comprises a die body 33, having an annular passage 34 flared at its opposite ends 35 and 36 and adapted to receive in threaded engagement therewith threaded dies 37 and 38 having axially disposed orifices, the entry orifice 39 and the exit orifice 40 respectively, of uniform cross-sectional diameter. The first of these orifices 39 defines the point of entry of the wire 12 into the first treatment zone formed by the annular passage or reservoir 34 and has a larger cross-sectional diameter than the exit orifice 40 which forms a sizing die controlling the thickness of the adhesive coating applied to the wire 12 in the initial treatment zone. Intermediate the opposite ends 35 and 36 of the passage 34 there is disposed an entry port 41 through which the adhesive however fed thereto is transmitted into the passage which thus serves as a reservoir in which the molten adhesive is applied to the advancing wire.

Whichever of the foregoing means of application is used, however, the temperature to which the normally solid adhesive is elevated to induce the necessary viscosity and resulting adhesion to the metal substrate is normally from about 200°F. to about 450°F. and preferably about 350°F. to about 450°F., the temperatures varying with the particular composition of the adhesive formulation, and the thickness of the adhesive coating 14 to be formed. The preferred range is employed particularly where the limitations on viscosity of the adhesive are more severe, that is, for example, where the cross-head applicator of FIG. 4 is utilized. Within the preferred parameters for practice of the present invention as defined herein, the temperature of the adhesive composition when applied in the first treatment zone is about 350°F. to about 450°F. to effect the continuous uniform coating required. The thickness of the coating is normally within the range of about 0.25 mils (0.00025 inch) to about 5 mils (0.005 inch) and preferably about 2 mils (0.002 inch).

Upon leaving the first treatment zone 24 the adhesive coated wire passes in a substantially linear manner through the ambient atmosphere, which is maintained normally at approximately 65°F. to 78°F., and constitutes a second treatment zone 42, in which the adhesive is returned to its substantially solid state. This zone has a length normally of about 20 feet to 100 feet for a residence time of about 0.01 to 0.5 minutes and preferably about 40 feet to about 80 feet a residence time of about 0.02 to 0.4 minutes. The most desirable cooling to enable the adhesive to assume the flexible, soft but solid and resistant to flow properties best adapted for effective entry into and activation of the adhesive 14 deposited about the wire 12 in the third treatment zone is generally about 60 feet or a residence time of about 0.03 to 0.3 minute. The ambient air provides the cooling medium of the second treatment zone, but the necessity of more effective cooling means is obviated by the metallic core 12 which functions as a heat sink for the elevated temperatures imparted to the adhesive in the first treatment zone.

The second treatment zone or cooling span 42 terminates in the third or vinyl resin deposition zone 43. This zone is composed of the annular passage defined by a cross-head die, also designated in this embodiment by the numeral 43. The passage through which the wire is transmitted in this zone may, illustratively, be smooth bore of uniform diameter or tapered to a relatively constricted diameter intermediate the opposite ends of the passage. The method involved is well known to those skilled in the art. The extrusion process involves, by way of illustration, blending vinyl halide resin in the form of a fine powder with plasticizer and other additives to form pellets, usually. This thermoplastic resin composition is then fed through a hopper (not shown) into one end of a conventional plastic extruder from which the plastic is then fed onto a standard screw 45 mounted in the circular passage or barrel 47 with a close clearance between barrel and screw surface of, for example, 0.001 inch per inch of screw diameter. The screw 45 is driven by a variable speed motor (not shown) which is capable normally of inducing a screw speed of 30 to 100 revolutions per minute (rpm). The barrel 47 is usually heated electrically and together with the heat resulting from the shearing of the pelletized vinyl resin composition advanced through the barrel 47 from the hopper by the screw 45 attains a molten state as it approaches the extruder head composed of the constricted passage of the adaptor 48 and cross-head die 43. The faster the line speed of the wire to be coated, the faster the speed of screw rotation and the higher the shearing temperature effected within the barrel 47. Consequently, the higher the temperature of the resin composition as it enters the cross-head die 43 and the more effective the bond achieved between the adhesive and vinyl coating. The temperature induced in the barrel 47 of the screw feed is sufficient to activate the hot melt adhesive advancing into the cross-head die from the second treatment zone, where the adhesive has been cooled and rendered sufficiently solid to pass unimpeded into the cross-head die without clogging of the latter at and about the point of entry of the adhesive-coated wire into the die.

The temperature attained in the extruder head or die of the third treatment zone is from about 300°F. to about 450°F. and preferably about 350°F. to about 400°F.; temperatures sufficient to effect an effective bond between the vinyl coating and the wire 12 without degradation of the adhesive or vinyl resin composition.

The coating applied in the cross-head die of the extruder is most desirably about 0.015 inch to about 0.025 inch in thickness where the product wire is to be woven into chain-link fence fabric.

The coated wire product 10 is then advanced into the final treatment zone 49 prior to being rewound on the take-up reel 22 driven by conventional electric motor or other drive means (not shown).

The final treatment zone comprises an intermediate air space or heat transfer zone 50 of about 10 to 20 feet or more in length and preferably about 12 to 20 feet, and a cooling bath or trough 52 through which cold water is circulated. The further removed from the cross-head die 43, the water-containing cooling bath 52 is positioned within the recited parameters the better the bonding of the vinyl resin coating 16 secured to the metallic substrate or core 12, since greater opportunity is given for activation of the adhesive 14 and a consequently improved bond. The residence time in the heat transfer zone 50 will vary within the range of from about 0.005 minute to 0.1 minute with a preferred range of about 0.006 minute to 0.1 minute.

The cooling bath 52, containing desirably a circulating stream of water operating at a temperature within the range most desirably of 50°F. to 70°F., serves to assure solidification of the adhesive and vinyl resin plies 14 and 16 respectively, so that the product 10 can be recoiled or otherwise stored or used after leaving the bath 52. The residence time within the bath is not narrowly critical. A minimum period of time is normally about 0.05 minute.

The hot melt adhesive compositions, employed in the practice herein described are those which will effect a satisfactory bond with the metallic conductor or core 12 and the vinyl coating or ply 16 at the indicated temperatures and within the related parameters described. Most desirably these hot melt adhesive compositions comprise copolymers of ethylene and vinyl acetate containing 4 to 6 mols of polymerized ethylene monomer per mol of vinyl acetate; have an inherent viscosity of about 0.6 to 1.2; and a mol weight of about 200,000 to 500,000. Amounts of a second component, a non-thermosetting phenolic modified terpene resin of from about 20 parts to as much as 400 parts by weight, and preferably about 20 to 40 parts thereof are admixed with each 100 parts by weight of the foregoing ethylene vinyl acetate copolymer. The terpene resins employed are those resulting from the acid-catalyzed condensation of a cyclic or acyclic monoterpene or sesqui-terpene, that is a terpene containing fifteen carbon atoms or less, with a phenol freely reactive, that is unsubstituted, in one or more of the ortho- and para-positions. Illustrative of unsubstituted terpenes desirable for use as aforesaid and which impart the requisite tackifying and plasticizing characteristics to the adhesive compositions of the invention are d-limonene, l-limonene, α-fenchene, dipentene, β-pinene, β-fenchene, bornylene, and the like. α-Pinene is particularly preferred.

Illustrative phenols which may be used in producing the foregoing non-thermosetting hot melt adhesives are those phenols substituted in the 3- or 3,5- positions and wherein the substituents are, illustratively, lower alkyl or alkoxy radicals, preferably straight-chain alkyl or alkoxy radicals containing from 1 to 3 carbon atoms, i.e. methyl, ethyl and propyl; halogens, e.g. chloro, iodo, and nitro and amino moieties. Illustrative of the freely reactive substituted phenols, that is those phenols unsubstituted in the ortho or para position, are 3-amino-phenol, 3-nitro-5-propyl phenol, 3,5-dichlorophenol, 3-methyoxyphenol, 2,5-di-methyl phenol and 3,4-diamino phenol. The preferred reactant with α-pinene is unsubstituted phenol, however in approximately equimolar proportions.

Suitable non-thermosetting phenolic-modified terpene resins for use in the practice of the present invention are also described, by way of further illustration, in U.S. Pat. No. 3,448,178. As noted in this patent, waxes or wax-like products may also be employed in amounts of up to 50 per cent by weight in partial substitution of the ethylene vinyl acetate copolymer to reduce the melt viscosity or cohesive properties of the composition without affecting in an appreciably adverse manner the adhesive characteristics thereof. Minor amounts usually not in excess of about one per cent by weight of additives, and particularly anti-oxidants such as butylated hydroxy toluene, propyl gallate or the like may also be incorporated as desired.

The resinous adhesives thus evolved are characterized by excellent adhesion to the vinyl resins and metallic substrates at the temperatures and within the other parameters set forth herein. At the same time, these adhesives have excellent low temperature flexibility, resistance to deformation; and most significantly provide an additional barrier against corrosion, thus further extending the useful life of the finished product 10, for example, whether employed in fencing materials such as chain-link fence or as an insulated electrical conductor.

The vinyl resins forming the protective coating 16 are commercially available vinyl halide, and particularly vinyl chloride, homopolymers, as well as copolymers containing at least 75 per cent by weight of vinyl chloride and up to about 30 per cent by weight of one or more other polymerized comonomers. Illustrative of the vinyl comonomers for use in the foregoing copolymers are vinyl esters of the following general formula:

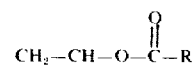

wherein R is a lower alkyl moiety and one preferably of from 2 to 4 carbon atoms. Illustrative of the comonomers are vinyl acetate, vinyl butyrate and vinyl propionate.

The vinyl resins thus employed in the practice of this invention provide the most significantly effective bond according to the practice, and under the conditions achieved hereunder in combination, by way of illustration, excellent protective properties including resistance to abrasion, weathering, oxidation and attack by a variety of other chemicals while being relatively inexpensive and easily handled.

Other significantly less preferred extrudable thermoplastic resins which may also be used, however, in the practice herein described include the polyolefins, notably low density polyethylenes and most desirably those having a low melt index of from about 0.2 to 0.4 as measured by ASTM Procedure D-1238-65T; and polyamides, such as nylon-6 and nylon - 12, which are pigmented and stabilized for long outdoor exposure.

The foregoing vinyl chloride homopolymers and copolymers are combined with plasticizer and preferably mixtures thereof, in an amount by weight of about 25 to about 40, and preferably about 28 to 32, parts for every 100 parts of resin (phr). Included among these plasticizers are liquid plasticizers among which are the alkyl and alkoxy alkyl esters of dicarboxylic acids or the esters of a polyhydric alcohol and a monobasic acid; and more specifically, phthalate plasticizers, such as dioctyl phthalate, butyl octyl phthalate, di-2-ethylhexyl phthalate, di-isodecyl phthalate, N-octyl phthalate, dinonyl phthalate, diisooctyl phthalate, butyl lauryl phthalate, butyl benzyl phthalate, and ethyl phthalyl ethyl glycolate; dibasic acid ester derivatives such as dioctyl adipate, dioctyl azelate, dioctyl sebacate, dibutylsebacate and glyceryl stearate. Also contemplated as plasticizers are phosphates such as trioctyl phosphate, triphenyl phosphate and tricresyl phosphate; as well as chlorinated fatty acid esters, alkyl epoxy stearates, epoxides of soya bean oil fatty acid, and epoxy linseed oil, Plasticizers which are particularly preferred for use in combination with the foregoing resins are plasticizers relatively insoluble in the components of the adhesive composition. Illustrative of these are polymeric plasticizers such as linear polyesters formed from propylene glycol, ethylene glycol and adipic or sebacic acid which are end-capped with monohydric alcohols or monobasic acids. It has been discovered that these non-migratory, and desirably polymeric, plasticizers enhance even further and significantly the effective bonding of the protective coating and metallic substrate, and thus the useful life of the product.

Other conventional components include stabilizers and pigments, normally from about 1 to 9 phr., and preferably about 3.5 to 5 phr. thereof. These components are well known within the field and commercially available. The stabilizers employed particularly are thermal and light stabilizers, such as illustratively, benzophenone and benzotriazole derivatives usually in an amount by weight of about 0.05 to 0.3 phr., and dibasic lead phosphite or cadmium and zinc salts in an amount by weight of about 0.05 to 0.3 phr. Pigments, employed in amounts of 0.0001 to 3.0 phr., are also well known and include, for example, phthalocyanine green, phthalocyanine blue, carbon black and titanium dioxide.

The resulting plasticized polyvinyl chloride resin compositions contain most desirably, no fillers, extenders or other extraneous matter. The colors or pigments are stabilized with conventional stabilizers as aforesaid, have a light fastness that shall withstand a minimum Weather-O-Meter exposure of 4000 and up to 5000 hours without any deterioration (Test Equipment Operating Light and Water Exposure Apparatus Carbon — Arc Type) ASTM D 1499, E 42 Type and 649 as applied to wire and pipe coating respectively. The extrusion grade semi-rigid vinyl resin utilized will have most desirably a maximum specific gravity of 1.30 to 1.32 (ASTM D 792); a hardness of about Durometer A 75 to 95, Shore A Durometer and preferably about 88 to 93; a tensile strength of about 1500 to 3500 (pounds per square inch gauge) psig and preferably about 2700 psig (ASTM D 412) and an ultimate elongation of about 270 to 280 percent (ASTM D 412). This protective vinyl resin is characterized by high abrasion resistance, maximum deformation of 15 percent at 120°C. (Underwriter Laboratories Test Procedure) under a 500 gram load and compression cut through of 1500 psig to 1800 psig and preferably 1700 to 1800 psig (Bell Laboratory Test Procedure). The vinyl clad product will withstand an accelerated aging test of 2000 hours at 145°F. without cracking or peeling.

The vinyl coating thus formulated can be applied continuously at high speed, with uniformity, from a conventional extruder in effective thickness as described above to achieve a protectively coated wire having all of the desired properties necessary for imparting an extended useful life to the product 10 under the vigorous conditions to which, for example, chain-link fence, as well as other insulated and protected metallic substrates in which the product 10 is to be used are normally subjected.

The coated wire combines, as will be evident from the accompanying description, means for producing a product of unusually desirable characteristics in a significantly efficient and inexpensive manner.

The following examples are further illustrative of the invention. In these examples all parts and percentages are by weight unless otherwise expressly indicated.

EXAMPLE 1

This example illustrates the production of wire having a protective coating bonded thereto in accordance with the invention.

A continuous substrate of galvanized steel wire 12 having a diameter of 0.106 inch and a tensile strength of 100,000 psig advanced at a rate of 250 feet per minute through mechanical cleaning means 17 and thence through the cross-head die of a Spraymation hot melt resin applicator in which the head or die attained a temperature of 450°F. and wherein a hot melt adhesive composition in the molten state and having a temperature of 390°F. was applied to the wire or filament 12 in a thickness of about 0.002 inch. The normally solid hot melt adhesive contained a combination of ethylene/vinyl acetate copolymer and a modified terpene resin sold by National Starch Corporation under the trade name National Starch 70-0418. From the cross-head die of the Spraymation application termed the first treatment zone, the wire was advanced in a substantially linear manner through the ambient atmosphere constituting the second treatment zone 40 having a length of about 40 feet, in which the adhesive coated wire was permitted to cool and solidify. The coated wire was then delivered to a third treatment zone 42 formed by the smooth annular bore of a second cross-head die into which molten vinyl chloride homopolymer, Colorite 9813 Black, a plasticized poly (vinyl chloride) containing low temperature ($-20°C$.) plasticizer, a mixture of thermal and ultra-violet stabilizers and pigment with no other fillers, extenders or other extraneous matter present, was fed from a conventional screw feed extruder 43.

The vinyl chloride resin feed had a light fastness sufficient to withstand (1) a minimum Weather-O-Meter exposure of 4000 hours without deterioration (Test Equipment Operating Light and Water Exposure Apparatus Carbon — Arc Type) ASTM D 1499, E 42 Type E, and (2) an accelerated aging test of 2000 hours at 145°F. without cracking or pealing. The resin had, in addition, a tensile strength of 2700 psi, ultimate elongation of 275 percent; a specific gravity of 1.30 maximum; a hardness not less than Durometer A 90 ± 5; maximum deformation of 15 percent at 120°C. under a 500 gram load and a compression cut through of 1500 psi; when measured by the appropriate test procedures recited in the description appearing hereinabove. The screw is rotated in the heated extruder barrel at a rate sufficient to knead the foregoing resin and exert a shearing force adequate, in turn, to induce a temperature in the plasticized resin being advanced in the barrel 45 and the extruder head or die 42 to about 350°F.

The cross-sectional diameter of the die was sufficient to provide a resin coating of 0.0185 inch and define an outside diameter of about 0.145 inch to the product wire 10 when the coating operation was complete.

The wire was next passed into the final treatment zone 49 including a cooling trough 52 in which water was circulated. This trough is removed from the die 43 by about fifteen feet in which span the coated wire travels in a linear path through a room temperature atmosphere. In this span the vinyl resin coating and hot melt adhesive perfect the bond initiated in the vinyl extruder's crosshead die and is cooled sufficiently to avoid accumulation of coating resin on the guide rolls of the trough. The coated wire was then advanced through the trough or dam 52 which was maintained at about 68°F. to 75°F. and the finished product recovered therefrom after a residence time of about 2.5 seconds. This product evidenced good adhesion 5 minutes after its recovery from the final treatment zone and could be stripped from the wire substrate only with difficulty.

EXAMPLE 2

This example illustrates the use of an increased line speed in the practice of the invention.

The procedure of Example 1 was repeated using a line rate of speed in the various treatment zones of 600 feet per minute. The plasticized vinyl resin at the point of application in the cross-head die had achieved a temperature of about 390°F. The surface finish was found improved to a glossy condition over that of Example 1. Adhesion of the vinyl coating was found improved over that secured in the product of Example 1.

EXAMPLE 3

This example illustrates the use of a line rate of speed significantly faster than that of Examples 1 and 2.

The procedure of Example 1 was repeated using a line rate of speed in the several treatment zones of about 900 feet per minute. The vinyl resin had a temperature of about 35°F. in the cross-head die. The surface gloss and adhesion were substantially improved over those secured at the lower rates of speed of Examples 1 and 2. The degree of surface gloss secured is significant in that the vinyl resin coating effected is important not only for its protective character but for its esthetic appeal as well, particularly where it is to be employed in the manufacture of chain-link fence.

EXAMPLE 4

This example illustrates the use of a line speed significantly faster than that of the prior examples.

The procedure of Example 1 was repeated using a line rate of speed in the several treatment zones of about 1000 feet per minute. The surface gloss was excellent, and the adhesion to the wire substrate of the vinyl resin coating as good as that secured in Example 3. The outside diameter of the product wire secured under conditions otherwise identical to those recited in Examples 1 to 4 was 0.148 inch, with a vinyl coat of 0.022 inch thickness. The speed of the coating operation was limited by extruder capacity and take-up capability of the apparatus used; not by the effectiveness or speed of application.

EXAMPLE 5

This example illustrates the use of a different formulation of hot melt adhesive in the practice of Example 1 utilizing the line speed of treatment described in Example 4.

The procedure of Example 1 is repeated using a line rate of speed in the several treatment zones of about 1000 feet per minute and utilizing as the hot melt adhesive a composition having the following formulation:

| Component | Parts |
| --- | --- |
| Ethylene/vinyl acetate copolymer (Union Carbide 605) | 40 |
| Modified terpene resin (sold by Penn Industrial Chemicals, Clayton, Pennsylvania under the trade name PICOLITE A 13) | 40 |
| Microcrystalline wax (sold by Sonneborn Division of | |

| Component | Parts |
| --- | --- |
| Witco Chemical Co., New York, New York under the trade name MULTIWAX 180 M) | 20 |
| Butylated hydroxy toluene (sold by Shell Chemical Co. under the trade name BHT) | 0.5 |

The resulting-bonded coating exhibited an excellent surface gloss and an adhesion superior to that secured in Examples 1 to 4.

EXAMPLE 6

This example illustrates the use of another hot melt adhesive formulation.

The procedure of Example 1 is repeated using a line rate of speed of about 1500 feet per minute and substituting for the hot melt adhesive of Example 1 the following formulation:

| Component | Parts |
| --- | --- |
| Ethylene/vinyl acetate copolymer containing approximately 5.4 mols of ethylene per mol of vinyl acetate and having an inherent viscosity of about 0.98 and a molecular weight of about 400,000 to 500,000 | 40 |
| Non-thermosetting resin prepared by the conventional acid-catalyzed reaction of equimolar proportions of α-pinene and phenol | 40 |
| Paraffin wax | 20 |

EXAMPLE 7

This example illustrates the use of a cross-head die of different construction for application to the wire substrate of the hot melt adhesive.

The procedure of Example 1 is repeated using a line rate of speed of about 1500 feet per minute and employing the Spraymation applicator of Example 1 with the cross-head applicator of FIG. 4 affixed to the outlet end thereof and the entry orifice 39 of the cross-head applicator has a uniform cross-sectional diameter of 0.112 inch; and the exit orifice a uniform cross-sectional diameter of 0.110 inch to provide a uniform coating of hot melt adhesive of 0.002 inch on the bare wire having a diameter of 0.106 inch.

EXAMPLE 8

This example illustrates the use of a dipping tank as an applicator for the hot melt adhesive, replacing the cross-head applicator of Example 7.

The procedure of Example 1 is repeated using a line rate of speed of about 900 feet per minute and substituting for the applicator of Example 7 the dipping tank of FIG. 3 wherein the sizing die through which the adhesive coated wire is advanced into the second treatment zone has a dimension identical to that of the exit orifice in the cross-head applicator of Example 7.

The determination of the extent of bonding of vinyl resin coating to the metal substrate where referred to in the foregoing examples was made using an inflexible arm suspended at its upper end by a tensile machine grip from a dynamometer; the lower end of the arm forming a horizontally disposed flange in which is defined an annular orifice or band of adjustable diameter, through which is passed a stripped wire core which the orifice or band is adapted to receive. The stripped wire is above the level of said orifice, coated with bonded vinyl resin according to the practice of the invention. The coated wire is about 2 inches in length. The bare wire extends downwardly about 4 inches from the foregoing orifice which is so limited that it will not permit the coated portion of the wire to pass through. The bare wire is held at the lower end by a standard tensile machine grip which is lowered under pressure to induce a pealing effect on the coated wire above the level of the orifice of the flange. The force or weight necessary to strip the wire is recorded on a load cell.

Various epoxy and acrylic adhesives and zinc chromate primers employed under conditions similar to those recited above evidenced normally either slight or no adhesion. Where any adhesion was secured the bond was brittle in addition to being significantly less than that secured according to the practice of this invention. Other acrylic resin adhesives such as that sold by Hughson Chemical Company in a two component system under the trade name designation Hughson 521 accelerator No. 3 (lacquer) modified acrylic adhesive system, exhibited good adhesion but required that the system be run at a very reduced line rate of speed.

It will be evident that the terms and expressions which have been employed are used as terms of description and not of limitation. There is no intention in the use of such terms and expressions of excluding equivalents of the features shown and described or portions thereof and it is recognized that various modifications are possible within the scope of the invention claimed.

What is claimed is:

1. A continuous process for applying a protective coating to a clean metallic substrate and simultaneously bonding said coating thereto that comprises applying, in a first treatment zone, to a rapidly advancing length of said substrate a first ply of molten hydropholic hot melt adhesive composition composed of a non-thermosetting phenolic-modified terpene resin and ethylene-vinyl acetate copolymer at a temperature of from about 200°F to 450°F to effect a bonding of said adhesive to said metallic substrate; advancing said adhesive coated substrate to a second treatment zone wherein said adhesive is cooled to a solid, soft, flow-resistant state and thereafter extruding onto said cooled adhesive in a third treatment zone, a molten extrudable thermoplastic resin composition selected from a plasticized vinyl resin, a polyolefin, and a polyamide at a temperature sufficient to melt said adhesive and effect a bond between said adhesive and said resin; and thereafter in a fourth treatment zone reducing the temperature of said advancing coated substrate to solidify the bonded coating of adhesive and thermoplastic resin composition.

2. A continuous process according to claim 1 for use in making a bonded protectively coated wire, wherein said metallic substrate comprises a wire unrolled from a coil and advanced through said plurality of treatment zones at a rate of speed of from about 200 feet per minute to 2000 feet per minute.

3. The process of claim 2 wherein the transmission of said wire through said treatment zones is substantially linear and is effected at a speed of about 800 feet per minute to about 2000 feet per minute.

4. The process of claim 3 wherein said adhesive composition is deposited upon said wire in a thickness of about 1 to about 5 mils and said vinyl chloride homopolymer compound is extruded onto said adhesive coating in a thickness of about 0.015 to 0.025 inch.

5. The process of claim 4 for use in making a bonded protectively coated wire suitable for chain-link fence fabric wherein said wire prior to treatment has a cross-sectional diameter of from about 0.076 inch to about 0.192 inch.

6. The process of claim 2 wherein the treatment zones wherein cooling occurs are maintained at about room temperature.

7. The process of claim 1 wherein said fourth treatment zone comprises the ambient atmosphere through which the coated wire is advanced after leaving the extruder, and a trough containing a cooling liquid medium through which said coated wire is advanced from said ambient atmosphere.

8. The process of claim 7 wherein the length of that portion of the fourth treatment zone comprising the ambient atmosphere is a span of about 10 to about 20 feet.

9. The process of claim 6 wherein said first treatment zone comprises a cross-head die through which said wire is advanced and in which said molten hot melt adhesive is applied thereto, said die having an exit orifice formed at the end of said die remote from the point of entry of said wire into said die; said exit orifice defining a sizing die of annular cross-sectional conformation and suitable for determining the thickness of adhesive coating applied to said wire.

10. The process of claim 6 wherein said first treatment zone comprises a dipping tank containing said hot melt adhesive and through which said wire is advanced, an exit orifice being defined in the wall of said tank opposite the point of entry of said wire into said tank; said exit orifice constituting a sizing die of annular cross-sectional conformation to determine the thickness of adhesive coating applied to said wire.

11. A process for applying and bonding a protective coating to a clean metallic substrate which comprises applying to a rapidly advancing length of said substrate a first ply of molten hydropholic hot melt adhesive composition composed of a non-thermosetting phenolic-modified terpene resin and ethylene vinyl acetate copolymer, cooling said adhesive composition to a soft, solid, flow-resistant state, extruding a molten extrudable thermoplastic resin composition selected from a vinyl resin, a polyolefin or polyamide on to said adhesive composition at a temperature sufficient to melt said adhesive composition and cooling whereby said thermoplastic resin composition is bonded to said substrate by means of said adhesive composition.

12. The process of claim 11 wherein said extrudable thermoplastic resin is a vinyl chloride homopolymer.

13. The process of claim 11 wherein said extrudable thermoplastic resin employed is a copolymer of vinyl chloride and a vinyl ester having the structure:

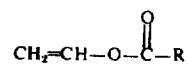

wherein R is a lower alkyl radical.

14. The process of claim 13 wherein said vinyl ester is vinyl acetate.

15. The process of claim 12 wherein said temperature at which the vinyl chloride homopolymer compound is extruded onto said adhesive coated substrate is about 300°F. to about 450°F.

* * * * *

UNITED STATES PATENT OFFICE
CERTIFICATE OF CORRECTION

Patent No. 3,941,866          Dated March 2, 1976

Inventor(s)   GLEN E. INGRAHAM

It is certified that error appears in the above-identified patent and that said Letters Patent are hereby corrected as shown below:

Column 8, lines 20-25, change the structural formula to recite as follows:

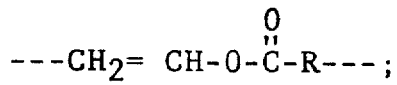

Column 10, line 41, change "pealing" to --peeling--;

Column 11, line 26, change "35°F." to --350°F.--;

Column 13, line 10, change "pealing" to --peeling--;

Claim 1, line 5 (Col. 13, line 39), change "pholic" to --phobic--;

Claim 4, line 3 (last line of Col. 13), insert after "said", the expression --vinyl resin is a--;

Claim 4, line 4 (first line of Col. 14), after "compound" insert --and--;

Claim 11, line 4 (Col. 14, line 41), change "hydropholic" to --hydrophobic--.

Signed and Sealed this eighth Day of June 1976

[SEAL]

Attest:

RUTH C. MASON
*Attesting Officer*

C. MARSHALL DANN
*Commissioner of Patents and Trademarks*